UNITED STATES PATENT OFFICE.

EMIL COLLETT, OF CHRISTIANIA, NORWAY.

PROCESS FOR THE MANUFACTURE OF AMMONIUM PERCHLORATE.

1,303,167.

Specification of Letters Patent.

Patented May 6, 1919.

No Drawing.

Application filed November 14, 1918. Serial No. 262,622.

*To all whom it may concern:*

Be it known that I, EMIL COLLETT, a subject of the King of Norway, of Christiania, Norway, have invented certain new and useful Improvements in Processes for the Manufacture of Ammonium Perchlorate; and I do hereby declare the following to be a full, clear, and exact description of the invention, such as will enable others skilled in the art to which it appertains to make and use the same.

Perchlorate of ammonium is usually manufactured in the manner that perchlorate of sodium is reacted upon with an ammonium salt such as the chlorid, sulfate or nitrate of ammonium. In all these known reactions the nature of the salts contained in the solution will be such that the difference in solubility of the various salts is comparatively small, great difficulties being consequently connected with the separation of the salts from each other and with the production of a pure ammonium perchlorate. As a matter of course the said difficulties also involve comparatively high costs of production. Moreover in all the usually employed processes for the manufacture of ammonium perchlorate the evaporation costs are very important.

The present invention has for its object a process for the production of ammonium perchlorate in which the inconveniences referred to above and the costs involved thereby are considerably reduced.

This process is characterized by the combination of a reaction between perchlorate of sodium and nitrate of ammonium with a conversion of nitrate of sodium into bicarbonate of sodium by a treatment with ammonium bicarbonate or ammonia and carbonic acid, this latter process being applied to the sodium nitrate bearing solution remaining after the precipitation of the ammonium perchlorate, so that a precipitation of bicarbonate of sodium and formation of nitrate of ammonium take place in the solution, which then could be reacted upon with further quantities of sodium perchlorate.

The process may be carried out in the following manner:

Solutions containing suitable percentages of sodium perchlorate and ammonium nitrate respectively are brought together, with the result that perchlorate of ammonium is formed which is precipitated in ample quantities, the said salt being of a comparatively low solubility, while the other salts contained in the solution in question are easily soluble. This reaction between nitrate of ammonium and perchlorate of sodium as such is already known. According to a known process as at present practised the mother liquor containing nitrates of ammonium and of sodium as well as the perchlorate of sodium and ammonium is evaporated and the substances contained therein separated from each other by fractional crystallization. This evaporation and crystallization is very troublesome and involves high costs. On the one hand the plant necessary for carrying the operation into effect is expensive for the reason that large quantities of water must be eliminated, which requires a voluminous apparatus and on the other hand special expensive materials for the evaporation apparatus structure must be used because ordinary iron is attacked by the liquids in question being therefore not applicable. The apparatuses accordingly will become very expensive as regards their construction as well as in operation, and the necessary expenses incident to amortization and repair. The other operations comprising the separation of the substances by crystallization are also very laborious and the costs of the crystallization, filtration, washing, conveyance and other manipulations consequently become very high as regards the plant as well as the expenses for wages, interest, repair and amortization.

All these difficulties and complications which attach to the hitherto employed methods for the manufacture of ammonium perchlorate and which are the source of such high expenses have brought it about that the manufacture of ammonium perchlorate, which is a product of great importance to the modern industry of explosives, has not attained the significance which it would possess if the manufacturing costs were lower. All the difficulties and cost referred to above can be avoided however when the described reaction between $NaClO_4$ and $NH_4NO_3$ in accordance with the present invention is combined with another known process, the mother liquor obtained by the reaction being treated in such a manner that the evaporation is avoided. It is known (cfr. Lunge: Ammoniak. 4th Ed. 1900, pages 257 and 258) to produce ammonium nitrate from sodium nitrate in solution by the addition of $NH_3$ and $CO_2$. Hereby $NaHCO_3$ is precipitated and $NH_4NO_3$ is retained in the solution.

The mother liquor from the reaction between $NaClO_4$ and $NH_4NO_3$ substantially contains $NaNO_3$. By the addition of ammonium carbonate or carbonic acid to this mother liquor $NaHCO_3$ will be precipitated, the content of $NaNO_3$ in the solution being converted into $NH_4NO_3$. The mother liquor containing besides $NaNO_3$ also considerable quantities of ammonium salts ($NH_4ClO_4$, $NH_4NO_3$) it would be expected that an addition of $NH_3$ and $CO_2$ would result in the precipitation of ammonium salts together with $NaHCO_3$. The surprising observation has been made however that this does not take place. The explanation of this fact may be found in the formation of certain insoluble double compounds of the salts contained in the solution. However that may be, the fact is that a considerable proportion of the sodium content of the mother liquor is precipitated as $NaHCO_3$ so that the $NO_3$ of the mother liquor is again combined with the $NH_3$ as $NH_4NO_3$. It is thus possible in a very simple manner and without any evaporation to produce a solution of nitrate of ammonium, which may again be reacted upon with further quantities of $NaClO_4$. Of course this solution of $NH_4NO_3$ contains some other salts of Na and $NH_4$ combined with $ClO_4$, $NO_3$ and $CO_3$ but this fact is without importance to the use of the liquid as an $NH_4NO_3$ solution for the reaction with $NaClO_4$. The fact is that when this latter substance is added in a suitable manner either in a dissolved state or as a solid to the regenerated $NH_4NO_3$ solution, $NH_4ClO_4$ is precipitated as fine pure crystals, which are easily filtered and washed.

An embodiment of the invention is described in the following by way of example:

A liquid containing $NH_4NO_3$ as a substantial constituent is heated and supplied with $NaClO_4$ in a solid condition (or in the form of a more or less concentrated solution if this is desirable) whereupon the solution is cooled. $NH_4ClO_4$ is precipitated and is then separated from the liquid (no evaporation being required). The liquid is then supplied with $NH_3$ and $CO_2$, whereby $NaHCO_3$ precipitates (still no evaporation necessary). The superposed liquid which now contains $NH_4NO_3$ is again supplied with $NaClO_4$ as above described whereby $NH_4ClO_4$ precipitates. This treatment is continued with alternative precipitation of $NH_4ClO_4$ and $NaHCO_3$ respectively the same water being repeatedly used for the solution so that all evaporation (except of the water necessary for the washing operation) and all costs and difficulties connected with such evaporation are avoided.

Besides the advantages mentioned above, the present process also involves the advantage over the usual methods in that either a pure sodium bicarbonate or soda is obtained as a by-product in a simple and efficient way, the said product being as is known, an article in demand and for which there is a ready market. By the usual method of manufacturing $NH_4ClO_4$, that is from $NaClO_4$ and $NH_4Cl$ sodium chlorid is obtained as a by-product. As is known, however, this substance is of a low commercial value, this being particularly so in the present instance because it is difficult to obtain a product free from $NH_4ClO_4$ and other ammonium salts. A content of these latter salts renders the product unsuitable for use in foods and as a material for electrolytical conversion into $NaClO_4$ because the ammonium salts present are by electrolysis converted into $NCl_3$ which is a highly explosive substance and its manipulation consequently connected with danger. The electrolysis of such sodium chlorid is for these reasons not practicable.

It is obvious therefore that the above described combination of operation involves a great technical and economical improvement with regard to the technical execution of the process as well as regarding the efficient utilization of the employed products.

I claim:

1. Process for the manufacture of ammonium perchlorate comprising the step of reacting upon sodium perchlorate with ammonium nitrate in combination with the step of reacting upon the resulting sodium nitrate in the presence of ammonium bicarbonate.

2. Process for the manufacture of ammonium perchlorate comprising the step of reacting upon sodium perchlorate with ammonium nitrate in combination with the step of reacting upon the resulting sodium nitrate in the presence of carbon dioxid and ammonia.

3. Process for the manufacture of ammonium perchlorate comprising the step of reacting upon sodium perchlorate with ammonium nitrate in excess, in combination with the step of reacting upon the resulting sodium nitrate in the presence of ammonium bicarbonate.

4. Process for the manufacture of ammonium perchlorate comprising the step of reacting upon sodium perchlorate with ammonium nitrate in excess, in combination with the step of reacting upon the resulting sodium nitrate in the presence of carbon dioxid and ammonia.

5. Process for the manufacture of ammonium perchlorate consisting in reacting upon ammonium nitrate with sodium perchlorate in the presence of water, separating the precipitated ammonium perchlorate from the solution, reacting upon the sodium nitrate contained in the said solution with ammonia and carbonic acid, separating the precipitated sodium bicarbonate and adding a further quantity of sodium perchlorate to the solution to precipitate ammonium perchlorate.

In testimony that I claim the foregoing as my invention, I have signed my name in presence of two subscribing witnesses.

EMIL COLLETT.

Witnesses:
MAGENS BUGGE,
MATHILDE ENGEHEKEN.

Copies of this patent may be obtained for five cents each, by addressing the "Commissioner of Patents, Washington, D. C."